United States Patent
Mehta et al.

(10) Patent No.: US 11,481,712 B2
(45) Date of Patent: Oct. 25, 2022

(54) METHOD AND SYSTEM FOR DETERMINING A NON-JOB RELATED SCORE FROM REPORTED HISTORICAL JOB PERFORMANCE

(71) Applicant: Metabyte Inc., Fremont, CA (US)

(72) Inventors: Manu Mehta, Fremont, CA (US); Lynn Randolph Slater, Jr., Pleasanton, CA (US); Anjali Dayal, Pleasanton, CA (US); Nitin Mehta, Fremont, CA (US); Saiba Singh, Pleasanton, CA (US)

(73) Assignee: Metabyte Inc., Fremont, CA (US)

( * ) Notice: Subject to any disclaimer, the term of this patent is extended or adjusted under 35 U.S.C. 154(b) by 6 days.

(21) Appl. No.: 16/826,232

(22) Filed: Mar. 21, 2020

(65) Prior Publication Data

US 2020/0302355 A1 Sep. 24, 2020

Related U.S. Application Data

(60) Provisional application No. 62/822,065, filed on Mar. 22, 2019.

(51) Int. Cl.
*G06Q 10/06* (2012.01)
*G06Q 10/10* (2012.01)

(52) U.S. Cl.
CPC ..... *G06Q 10/0639* (2013.01); *G06Q 10/1053* (2013.01)

(58) Field of Classification Search
CPC ........................ G06Q 10/0639; G06Q 10/1053
(Continued)

(56) References Cited

U.S. PATENT DOCUMENTS

2009/0276233 A1* 11/2009 Brimhall ................ G06Q 30/02
705/38
2011/0016056 A1* 1/2011 Hargroder .............. G06Q 40/08
705/325
(Continued)

FOREIGN PATENT DOCUMENTS

WO WO-0213095 A2 * 2/2002 ........... G06Q 10/063

OTHER PUBLICATIONS

Hedricks, Best Practices in Reference Checking: How SkillSurveys Pre-Hire 360 Measures-Up, 2016, http://docplayer.net/19417464-Best-practices-in-reference-checking-how-skillsurvey-s-pre-hire-360-measures-up.html, p. 1-6.*

*Primary Examiner* — Jerry O'Connor
*Assistant Examiner* — James Webb
(74) *Attorney, Agent, or Firm* — Ashok Tankha

(57) ABSTRACT

A method of determining a Trac score representing an individual's future employment behavior using past and present employment behavior that are unrelated to skills and job match within a job and across multiple jobs of an individual when combined with public and available external records. A method employing a Trac score calculation system comprises at least one processor to execute computer program instructions for obtaining one or more ratings from one or more users through one or more user devices connected to the Trac score calculation system that assigns the credibility to the ratings. A combination of the Trac sub-score obtained by accumulating the ratings weighted by estimated credibility of each rating, and Adjustment sub-score obtained by processing available external records in public and private forms, creates a Trac score which is a numerical and reflects an aggregation of available data weighted by what is believed to affect the employment behavior.

17 Claims, 17 Drawing Sheets

(58) Field of Classification Search
USPC .......................................................... 705/7.38
See application file for complete search history.

(56) References Cited

U.S. PATENT DOCUMENTS

2012/0215710 A1*  8/2012  Scarborough ............ G09B 7/00
                                                 705/321
2014/0122188 A1*  5/2014  Van Pelt .......... G06Q 10/06398
                                                 705/7.42
2016/0379170 A1   12/2016  Pande

* cited by examiner

| T_ID | T_WEIGHT | T_DIR | T_QUESTION |
|---|---|---|---|
| T_GOOD | 2 | 1 | ARE THEY A GOOD WORKER? |
| T_WILLING | 1 | 1 | HOW WILLING ARE YOU TO WORK WITH THEM AGAIN? |
| T_SATIS | 1 | 1 | HOW SATISFIED ARE YOU WITH THEIR CUSTOMER SERVICE? |
| T_SLEEZE | -1 | -1 | HOW SLEEZY ARE THEY? |

FIG. 11A

| F_ID | F_CONTRIB | F_DIR | F_OVERRIDE | F_QUESTION |
|---|---|---|---|---|
| T_HYGIENE | 0.1 | -1 | NULL | DO THEY HAVE BAD HYGIENE? |
| T_VIOLENT | 0 | -1 | 0 | HAVE THEY COMMITTED VIOLENT CRIMES IN THE WORKPLACE? |
| T_CMOH | 0.3 | 1 | NULL | HAVE THEY WON THE CONGRESSIONAL MEDAL OF HONOR? |

FIG. 11B

| F_ID | F_CONTRIB | F_DIR | F_OVERRIDE | F_QUESTION |
|---|---|---|---|---|
| T_BADC | 0.1 | 1 | NULL | BAD CREDIT |
| T_WILLING | 0.3 | -1 | NULL | LITIGITIOUS |
| T_SATIS | 0.3 | 1 | NULL | BROADLY ACCLAIMED |
| T_JAILED | 0.1 | -1 | 0 | CURRENTLY INCARCERATED |

FIG. 11C

| RATEE_ID | RATER_ID | R_TYPE | R_ID | R AMOUNT PRESENT | R CREDIBILITY |
|---|---|---|---|---|---|
| e1 | r1 | TRAC | T_GOOD | 0.8 | 0.4 |
| e1 | r1 | TRAC | T_WILLING | 0.6 | 0.4 |
| e1 | r1 | TRAC | T_SATIS | 1 | 0.4 |
| | | | | | |
| e1 | r2 | TRAC | T_GOOD | 0.7 | 0.5 |
| e1 | r2 | TRAC | T_WILLING | 0.7 | 0.5 |
| e1 | r2 | TRAC | T_SATIS | 0.6 | 0.5 |
| e1 | r2 | TRAC | T_SLEEZE | 0.1 | 0.5 |
| e1 | r3 | TRAC | T_GOOD | 0.8 | 0.6 |
| e1 | r3 | TRAC | T_WILLING | 0.8 | 0.6 |
| e1 | r3 | TRAC | T_SATIS | 0.9 | 0.7 |
| | | | | | |
| e1 | r4 | TRAC | T_GOOD | 0.6 | 0.4 |
| e1 | r4 | TRAC | T_WILLING | 0.9 | 0.5 |
| e1 | r4 | TRAC | T_SATIS | 0.9 | 0.6 |
| | | | | | |
| e1 | r1 | FLAG | T_HYGENE | 0.4 | 0.4 |
| e1 | r2 | FLAG | T_HYGENE | 0.6 | 0.5 |
| | | | | | |
| e1 | | | T_BADC | 0.4 | 0.7 |
| e1 | | | T_BADC | 0.5 | 0.7 |

FIG. 11D

| RATEE_ID | RATER_ID | R_TYPE | R_ID | R AMOUNT PRESENT | R CREDIBILITY |
|---|---|---|---|---|---|
| | | TRAC | T_GOOD | 0.7 | 0.9 |
| | | TRAC | T_WILLING | 0.8 | 0.5 |
| | | TRAC | T_SATIS | 0.5 | 1 |
| | | TRAC | T_SLEEZE | 0.1 | 0.3 |

FIG. 11E

| T_ID | T_WEIGHT | T_DIR | POSITIVE WEIGHT | R AMOUNT PRESENT | R CREDIBILITY | SCORE |
|---|---|---|---|---|---|---|
| T_GOOD | 2 | 1 | 2 | 0.7 | 0.9 | 1.26 |
| T_WILLING | 1 | 1 | 1 | 0.8 | 0.5 | 0.4 |
| T_SATIS | 1 | 1 | 1 | 0.5 | 1 | 0.5 |
| T_SLEEZE | -1 | -1 | 0 | 0.1 | 0.3 | -0.03 |
| | | | | | | |
| | | | | | | |
| | SUM (POSITIVE WEIGHTS) | | 4 | | | |
| | SUM (SCORE) | | | | | 2.13 |
| | COMBINED TRAC SCORE | | | | | 0.53 |
| | | | | | | |

FIG. 11F

METHOD AND SYSTEM FOR DETERMINING A NON-JOB RELATED SCORE FROM REPORTED HISTORICAL JOB PERFORMANCE

CROSS-REFERENCE TO RELATED APPLICATIONS

This application claims priority to and the benefit of the provisional patent application titled "Method And System For Determining A Non-Job Related Score From Reported Historical Job Performance", application No. 62/822,065, filed in the United States Patent and Trademark Office on Mar. 22, 2019. The specification of the above referenced patent application is incorporated herein by reference in its entirety.

BACKGROUND

People often have a history of having worked in many jobs in their career. When employers need to fill jobs, employers try to evaluate how effective a candidate will be for the particular job. Job effectiveness is affected by a person's skills and traits, but in addition to whether a person's skills are appropriate for a particular job, a person's behavior affects the effectiveness of the candidate on a job. Behaviors comprise reliability, diligence, ownership of responsibilities, interactions with coworkers, and interactions with customers. The exact behaviors that makes a candidate effective is difficult to identify, but if an observer could "ask around" they may find that "everybody" knows that a particular person is a good worker, and another person is not. An employer, both a person's current employer and a prospective employer might reasonably conclude that a person who has always been a good worker will likely continue to be a good worker and would prefer to hire, and train such workers with the skills they need to perform other jobs. Conversely, an employer may reasonably consider someone who has not been a good worker in the past to be ineligible of retaining, acquiring, or moving into other positions.

Currently, businesses try to infer employee behavior from subjective criteria such as frequency of job changes, etc. In many cases, a business operates mostly using a candidate's self reported information such as resumes which rarely contain negative information and often contain inaccurate, positive information. Therefore, there is a need for a system that provides hiring decisions based on objective and better hiring criteria.

Hence, there is a long felt but unresolved need for a method and a system for determining a Trac score for ascertaining an individual's future employment behavior using past and present employment behavior that are unrelated to skills and job match within a job, based in part on multiple jobs of the individual when combined with public and available external records.

SUMMARY OF THE INVENTION

This summary is provided to introduce a selection of concepts in a simplified form that are further disclosed in the detailed description of the invention. This summary is not intended to determine the scope of the claimed subject matter.

The method and system disclosed herein addresses the above recited need for determining a Trac score for ascertaining an individual's future employment behavior using past and present employment behavior that are unrelated to skills and job match within a job, and across multiple jobs of the individual when combined with public and available external records. The method and system disclosed herein determines a non-job related score using past and present employment behavior. The non-job related score represents an individual's future employment behavior. The non-job related score, herein referred to as Trac score, is determined in a numerical form. The method disclosed herein employs a Trac score calculation system comprising at least one processor configured to execute computer program instructions for determining a Trac score representing an individual's future employment behavior using past and present employment behavior that are unrelated to skills and job match within a job, and across multiple jobs of the individual when combined with public and available external records.

The Trac score calculation system obtains one or more ratings from one or more users through one or more user devices connected to the Trac score calculation system. The obtained one or more ratings comprises a Trac score questions list, a flag questions list, and an external factors list. The Trac score calculation system assigns credibility to the obtained ratings by invoking an external credibility process engine. The credibility of the rating is estimated based on the source of the rating, degree of consistency of the rating with one or more available ratings different from the ratings, recency of the rating, and estimated credibility of the one or more users providing the rating. The external credibility process engine inserts the obtained one or more ratings comprising the credibility into one or more ratings list, and updates the credibility for each one or more ratings.

The Trac score calculation system inserts one or more external factor ratings from an external factors list to the obtained ratings by invoking an exterior external factors engine. The exterior external factors engine is available outside the Trac score calculation system. The exterior external factors engine obtains the external factor ratings by processing available external records, both public and private forms. The external public and private records comprise one or more of criminal history, credit scores, certifications, and background checks of the individual. The exterior external factors engine updates, inserts, deletes or replaces one or more obtained ratings for the same external factor into the one or more ratings list. The Trac score calculation system obtains an adjustments sub-score by accumulating the obtained ratings weighted by estimated credibility of each of the one or more ratings. Those adjustments past a threshold of credibility and negativity will be considered to be red flags.

The Trac score calculation system obtains the Trac sub-score by accumulating the obtained ratings weighted by the estimated credibility of each of one or more ratings by performing merging actions on the obtained one or more ratings with the credibility, and returning a list of unique merged ratings by a merging module of the Trac score calculation system and combining the merged one or more ratings into a final Trac score and computing a Trac score by a Trac score computation module of the Trac score calculation system from the merged ratings. The Trac score calculation system computes the Trac score by the Trac score computation module by combining the unique merged one or more ratings of type Trac into a Trac sub-score and combining the unique merged one or more ratings of type flag and external into an adjustment sub-score.

The Trac score calculation system computes a Trac score by combining the Trac sub-score and the adjustment sub-score. The Trac score is a numerical that reflects an aggregation of the available external records comprising public and private forms weighted by factors that affect the employment behavior.

The Trac score is used to create a pricing policy that determines whether the individual has the employment behavior needed for performing a future job. The Trac score of the individual is combined with a job match score of the individual for a particular job, to determine whether the individual has the future employment behavior, the skills, and the fitness for performing aa particular job.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, in an embodiment, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIGS. 11A-11F exemplarily illustrate tabular representations of computations associated with one or more ratings for determining a Trac score representing an individual's future employment behavior using past and present employment behavior that are unrelated to skills and job match within a job and across multiple jobs of the individual when combined with public and available external records.

DETAILED DESCRIPTION OF THE INVENTION

Figure 1:
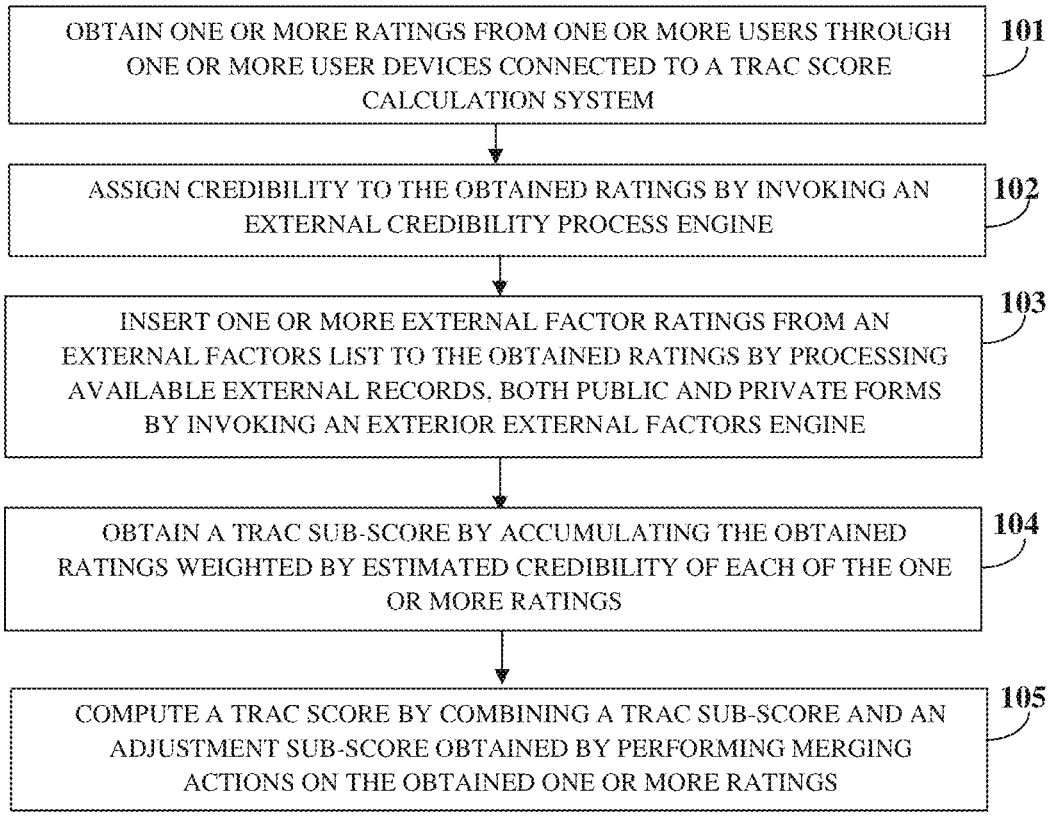
FIG. 1 illustrates a method for determining a Trac score representing an individual's future employment behavior using past and present employment behavior that are unrelated to skills and job match within a job and across multiple jobs of the individual when combined with public and available external records.

FIG. 1 illustrates a method for determining a Trac score representing an individual's future employment behavior using past and present employment behavior that are unrelated to skills and job match within a job and across multiple jobs of an individual when combined with public and available external records. The method disclosed herein determines a non-job related score using past and present employment behavior. The non-job related score, herein referred to as Trac score is determined in a numerical form. The non-job related score represents an individual's future employment behavior and is formed by combining a Trac sub-score with an adjustment sub-score. The Trac score reflects an aggregation of the available data weighted by factors that affect employment behavior. In an embodiment, the Trac score disclosed herein is accompanied by "Red Flags" that represent additional information an employer may want to consider before filling a particular job with a particular person. The Trac sub-score is formed by the accumulation of ratings weighted by the estimated credibility of each rating.

The method disclosed herein employs a Trac score calculation system comprising at least one processor configured to execute computer program instructions for determining a Trac score representing an individual's future employment behavior using past and present employment behavior that are unrelated to skills and job match within a job and across multiple jobs of an individual when combined with public and available external records. The Trac score calculation system obtains 101 one or more ratings from one or more users through one or more user devices connected to the Trac score calculation system. The ratings are a small number of numerical answers. The obtained one or more ratings comprises a Trac score questions list, a flag questions list, and an external factors list.

A rating is one person's answer to questions about another. The questions must be few in number and simple to answer, and the answers must be able to be mapped into numerical value. However, to answer the question a rater may consider many variable and subjective factors. The questions can be formed on a scale of 1-5, for example: Is the person a good worker? How willing are you to work with the person again? How satisfied are you with the person's customer service? The questions may change based on the rater and the nature of the relationship with the rated person. For example, a co-worker doing the same job might be asked different questions than a customer they are supporting.

The Trac score calculation system assigns 102 credibility to the obtained ratings by invoking an external credibility process engine. The credibility of the rating is estimated based on the source of the rating, degree of consistency of the rating with one or more available ratings different from the ratings, recency of the rating, and estimated credibility of the one or more users entering the rating. For example, a professional recruiter might be considered to be highly credible and the ratings that the professional recruiter enters may have a correspondingly stronger effect on the Trac sub-score. In an embodiment, the external credibility process engine obtains a ratee_id and updates the credibility field in the corresponding ratings table entries. The external credibility process engine inserts the obtained one or more ratings comprising the credibility into one or more ratings list and updates the credibility for each one or more ratings.

The Trac score calculation system inserts 103 one or more external factor ratings from an external factors list to the obtained ratings by invoking an exterior external factors engine. The exterior external factors engine obtains these ratings by processing available external records, both public and private records. Examples of such records are criminal history, credit scores, certain hard to obtain certifications, and background checks. The set of available external records changes over time. A set of rules decides on the adjustments to be triggered by certain events. For example, a rule may find a downward adjustment when there is a criminal history involving violence. Most of the adjustments are for negative factors found in these records. The exterior external factors engine updates, inserts, deletes or replaces one or more obtained ratings for the same external factor into one or more ratings list. The Trac score calculation system obtains the adjustments sub-score by the sum(weight*dir*amount present*credibility). In an embodiment, if any of the obtained external factor ratings has an override value, and if the amount present and credibility are past a threshold, then the combined score will be the value of that override. If there are multiple qualifying entries with overrides, the adjustment sub-score will be the lowest override value. Each rating is for a particular job performed by one person. The adjustment sub-score is obtained by processing available external records, both public and private. The available records result in an adjustment sub-score and by a set of Red Flags.

The Trac score calculation system obtains 104 the Trac sub-score by accumulating obtained ratings weighted by estimated credibility of each of one or more ratings by performing merging actions on the obtained one or more ratings with the credibility, and returning a list of unique merged ratings by a merging module of the Trac score calculation system and by combining the merged one or more ratings into a Trac sub-score.

The Trac score calculation system computes 105 a Trac score from the merged ratings. All the ratings of type "Trac" merges together, while the ratings of types "flag" and "external" are adjustment factors that could be positive or negative. The Trac score calculation system combines the unique merged ratings of type 'trac' into one Trac sub-score. The Trac score calculation system combines the unique merged ratings of type 'flag' and 'external' into one adjustment sub-score. The Trac score calculation system combines the Trac sub-score and the adjustment sub-score to generate the final Trac score.

The Trac score is the Trac sub-score combined with the adjustment sub-score.

The Trac score reflects an aggregation of opinions, some of which may be inaccurate or even malicious. With enough scores it may be that the incorrect ratings become of low effect. However, there is always a possibility that a Trac score differs significantly from reality. As the Trac score inherently may contain inaccuracies, it will not be released without the permission of the rated person. However, any employer is free to draw whatever conclusions they want from the non-availability of a Trac score. They could, for example, conclude that perhaps a person just was not often rated and while they might not conclude that the person would be a bad worker, they may prefer to choose someone with a suitable Trac score as that person has less risk of being a bad employee.

The Trac score calculation system further displays additional information accompanied by one or more red flags. The additional information is provided to an employer for consideration before hiring the individual for the job. The Trac score is used to create a pricing policy that determines whether the individual has the employment behavior needed for performing a future job. The Trac score of the individual is combined with a job match score of the individual for a particular job, to determine whether the individual has the future employment behavior, the skills, and the fitness for performing the particular job.

Figure 2:
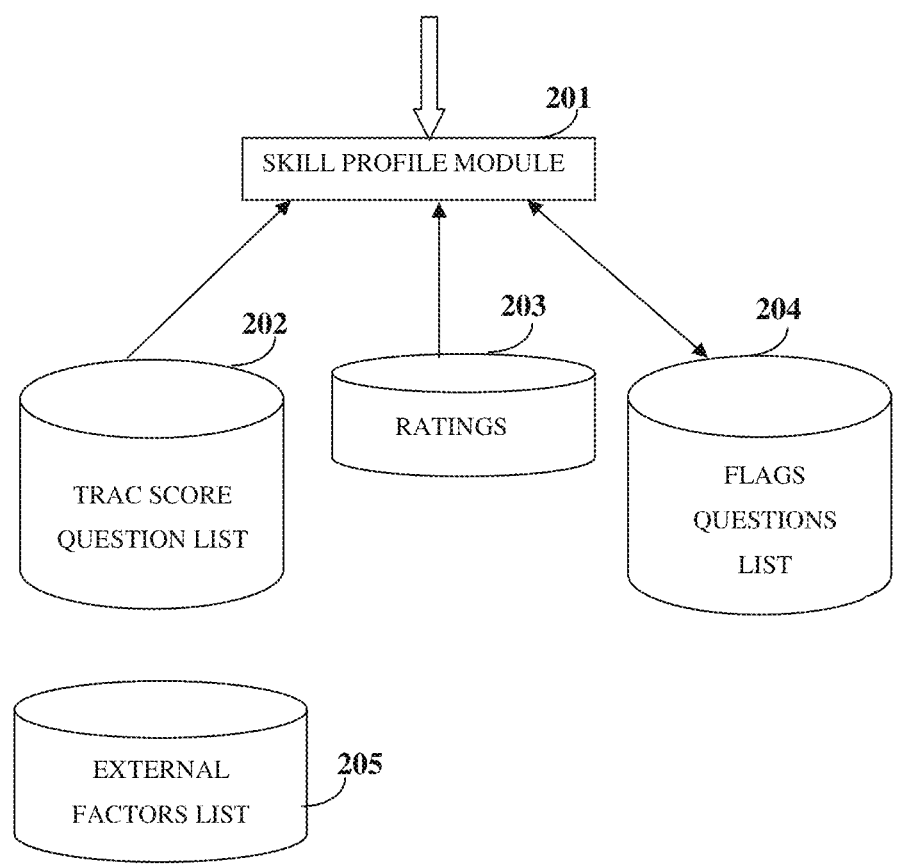
FIG. 2 exemplarily illustrates a flow diagram comprising the steps performed by the Trac score calculation system for receiving Trac score questions list, flag question list and the external factors list.

FIG. 2 exemplarily illustrates a flow diagram comprising the steps performed by the Trac score calculation system for receiving Trac score questions list 202, Flag question list 204 and the external factors list 205. The skill profile module 201 of the Trac score calculation system as exemplarily illustrated in the detailed description of FIG. 12B comprises the Trac score questions list 202, Hags question list 204, and the external factors list 205 obtained from one or more ratings 203. The Trac score question lists 202 are for example: "Is the person a good worker?", "How willing are you to work with the person again?" etc. The Flags question list 204 comprises questions, for example "Does the person have bad hygiene?", "Has the person committed a violent crime in the workplace?" etc. The external factors lists 205 are for example, bad credit, litigious, etc., for an individual for determining a Trac score representing an individual's future employment behavior using past and present employment behavior that are unrelated to skills and job match within a job, and across multiple jobs of the individual when combined with public and available external records.

Figure 3:
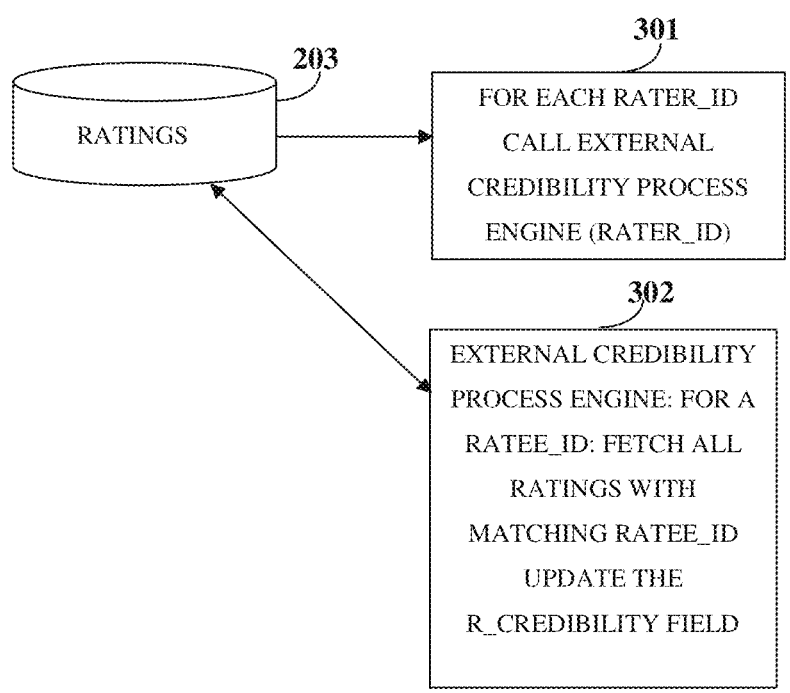
FIG. 3 exemplarily illustrates a flow diagram comprising the steps performed by the external credibility process engine for one or more obtained ratings.

FIG. 3 exemplarily illustrates a flow diagram comprising the steps performed by the external credibility process engine for one or more obtained ratings 203. The Trac score calculation system assigns credibility to the obtained ratings 203 by invoking an external credibility process engine 302. In an embodiment, for each ratee_id, the external credibility process engine 301 is called to examine the ratings for a ratee_id. The external credibility process engine 302 also examines other ratings as needed to compare the ratings for a ratee_id against the ratings of others or to compare the ratings from a rater_id against the ratings from others. If present, the external credibility process engine might also consider non-trac and non-flag ratings, for example, ratings for levels of skill and ratings for the plausibility of the descriptions of the job duties performed. The net effect is that the external credibility process engine updates 302 the R_credibility field for each rating whose R_Type is "Trac" or "Flag" for the given ratee_id.

Figure 4:
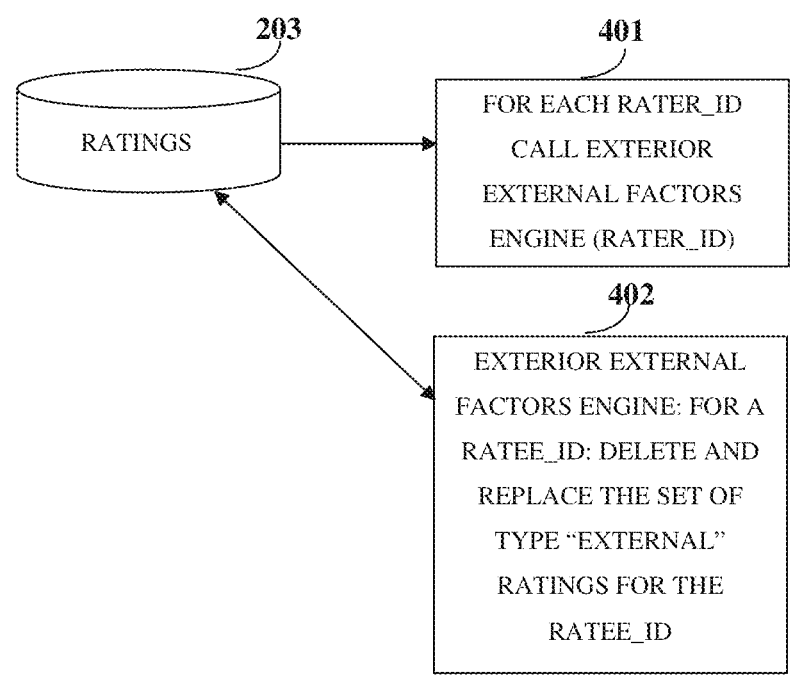
FIG. 4 exemplarily illustrates a flow diagram comprising the steps performed by the exterior external factors engine for one or more obtained ratings.

FIG. 4 exemplarily illustrates a flow diagram comprising the steps performed by the exterior external factors engine for one or more obtained ratings 203. The Trac score calculation system invokes an exterior external factors engine 402 that inserts ratings into the ratings list. These ratings will have R_type of "external" and will include credibility. The external credibility process engine is not run on these inserted ratings. The external credibility process engine is only for those ratings of other types. In an embodiment, for each ratee_id, the exterior external factors engine is called 401 with that ratee_id. The exterior external factors engine deletes, updates, inserts, or replaces 402 ratings for the Ratee_id where these rates have a R-Type of "external". The Rater_id will either be null, or a value that identifies the specific external factor process used. The exterior external factors engine 402 inserts multiple ratings for the same external factor. For example, an external factor that is derived from credit worthiness might have an entry corresponding to each of the credit bureaus that issued that rating.

Figure 5:
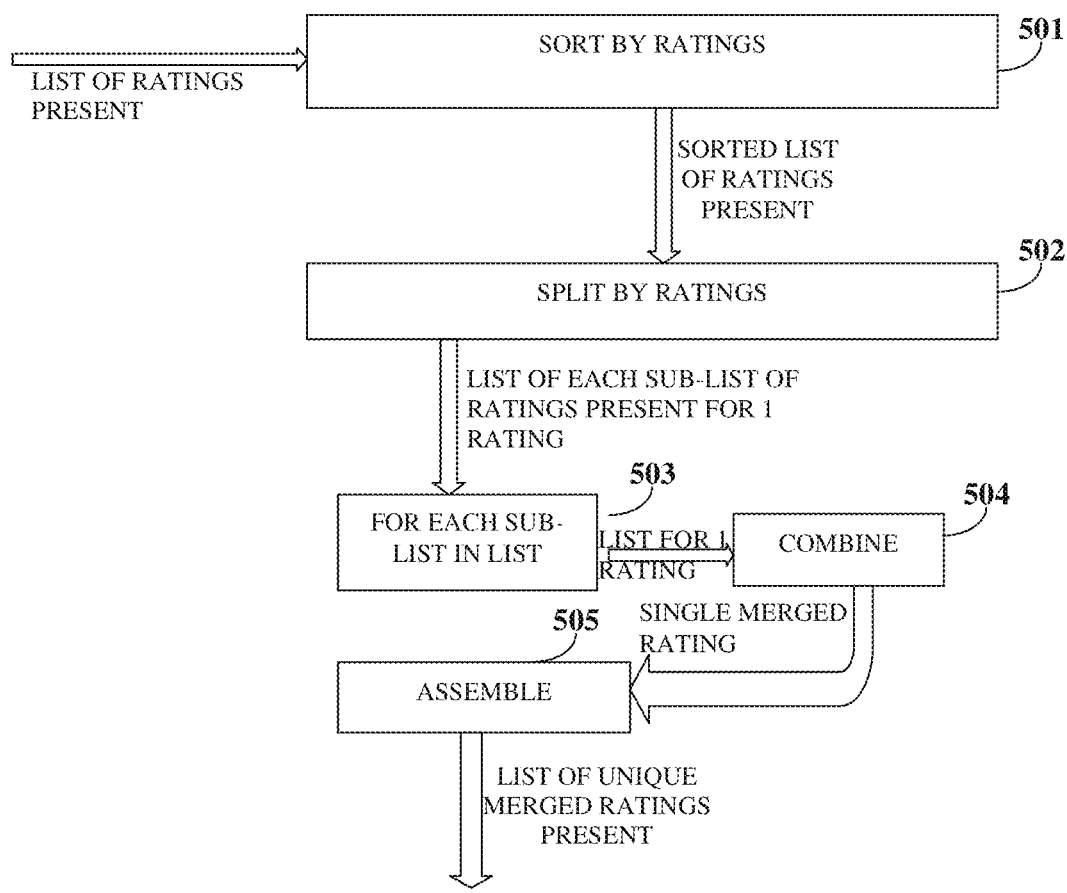
FIG. 5 exemplarily illustrates a flow diagram comprising the steps performed by the merging module of the Trac score calculation system for creating a unique merged ratings list.
Figure 12A:
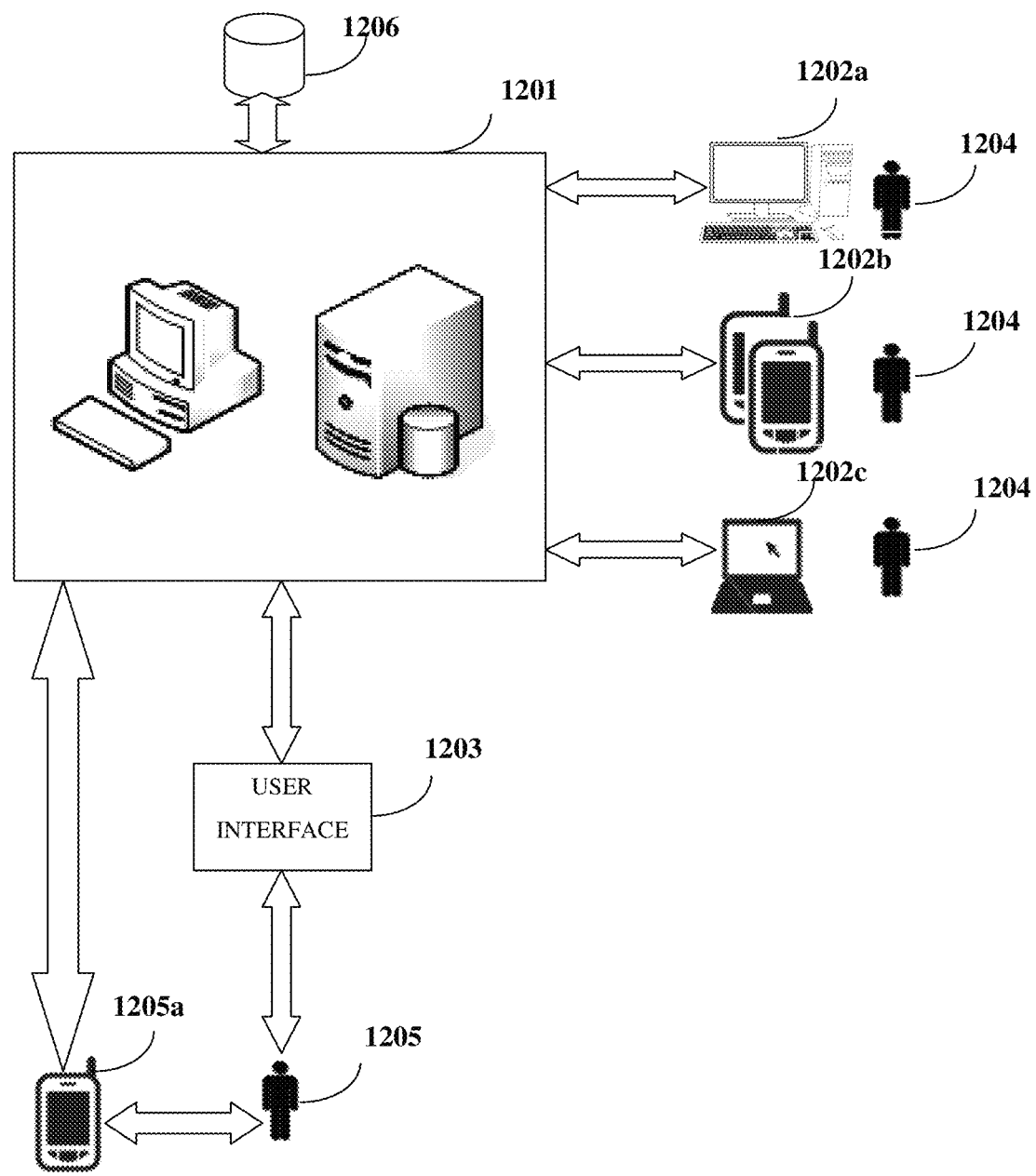
FIGS. 12A-12B exemplarily illustrate a computer implemented system comprising the Trac score calculation system for determining a Trac score representing an individual's future employment behavior using past and present employment behavior that are unrelated to skills and job match within a job and across multiple jobs of the individual when combined with public and available external records.
Figure 12B:
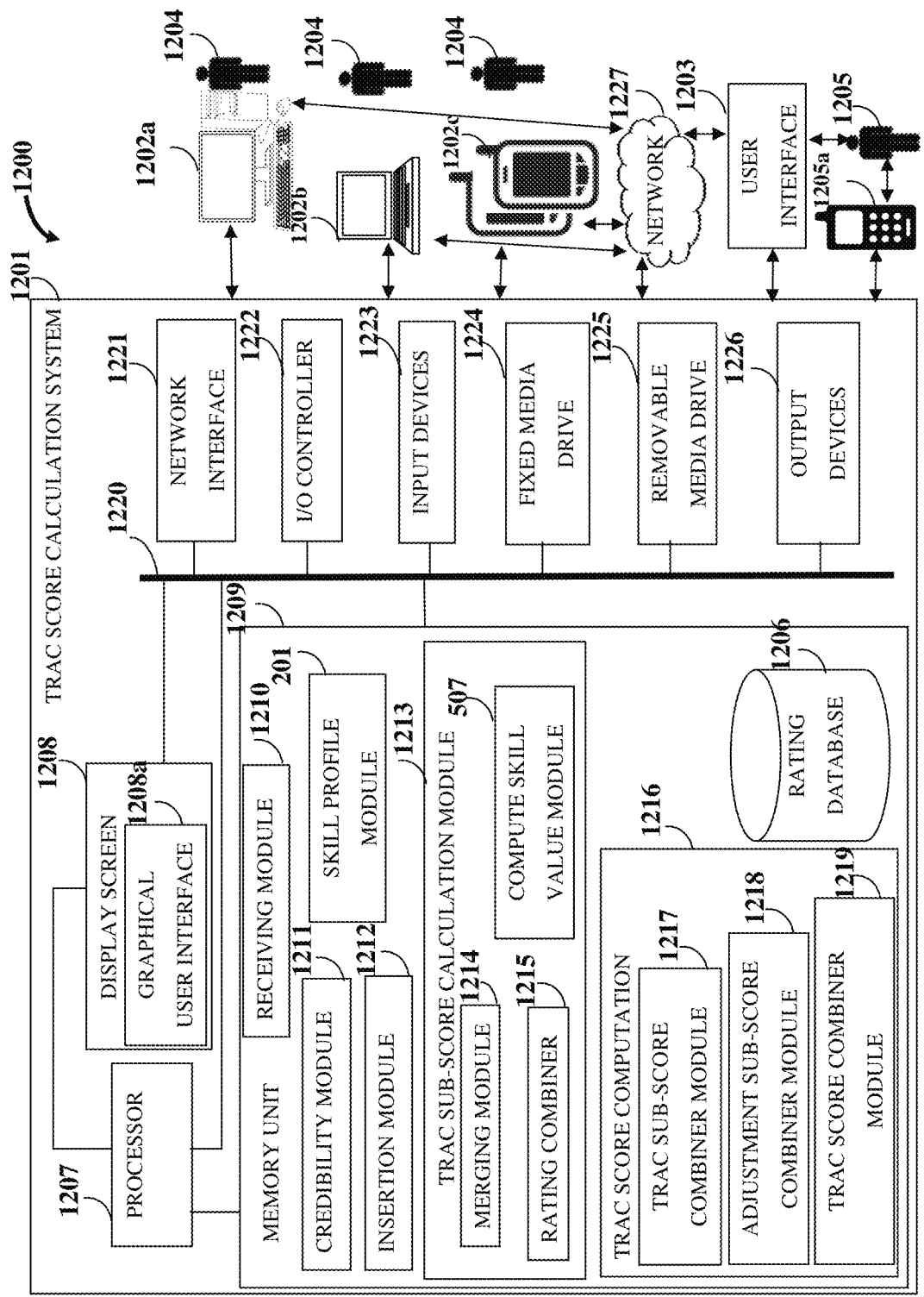

FIG. 5 exemplarily illustrates a flow diagram comprising the steps performed by the merging module of the Trac score calculation system exemplarily illustrated in FIG. 12B, for creating the list of unique merged ratings, that is, the unique ratings list in the Ratings table entries for a Ratee_id. The merging module combines multiple entries, that is, multiple occurrences of the ratings in the list of ratings present into one entry per rating in the list of unique merged ratings present with a combined amount present measure, that is, the merged amount measure, and a combined credibility measure, that is, the merged credibility measure. The Trac score calculation system invokes the merging module with a list of ratings present. The merging module sorts 501 the entries in the list of ratings present by the Ratee_id and then splits 502 the list of ratings present into N sub-lists of ratings present, where each sub-list of ratings present contains entries for a common rating, that is, for a Ratee_id. The merging module comprises a combining module for generating a single merged rating, that is, a unique merged rating from each of the N sub-lists of ratings present 503 as disclosed in the detailed description of FIG. 2. The N ratings of many questions are turned into a list of a single combined 504 rating per question. The merging module assembles 505 the unique merged rating from each of the N sub-lists of ratings present 503 into a new list of unique merged ratings present. A list of the unique merged ratings present, that is, the unique merged ratings list is the output of the merging module.

Figure 6:
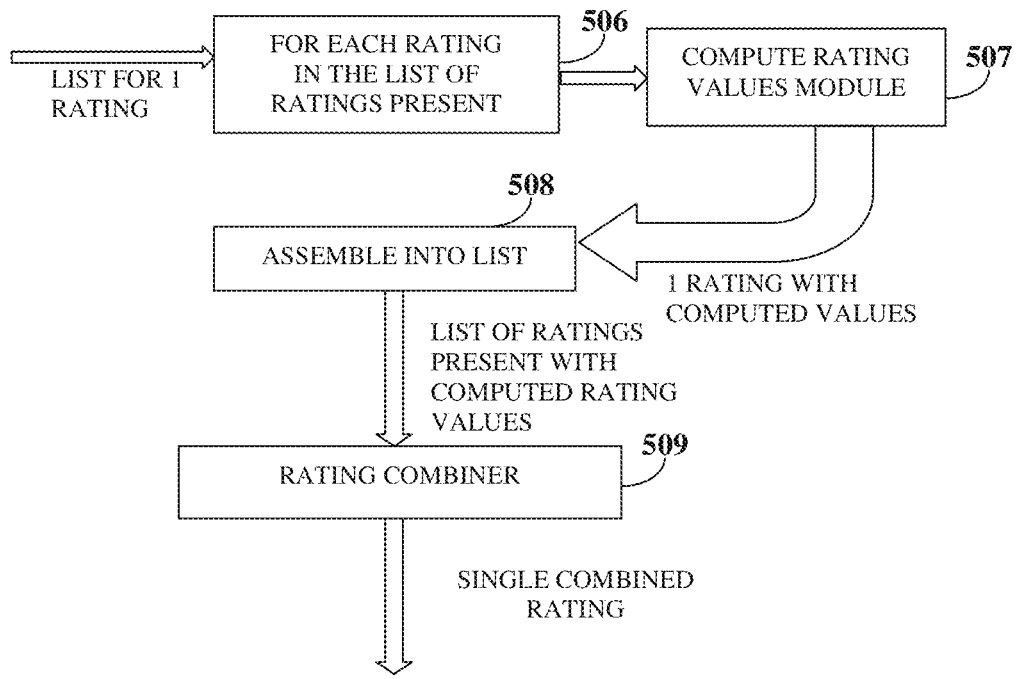
FIG. 6 exemplarily illustrates a flow diagram comprising the steps performed by the combining module of the Trac score calculation system for combining one or more ratings into a single merged rating.

FIG. 6 exemplarily illustrates a flow diagram comprising the steps performed by the combining module exemplarily illustrated in FIG. 12B, of the Trac score calculation system exemplarily illustrated in FIG. 12A, for combining one or more ratings into a single merged rating. The Trac score calculation system invokes the combining module with a sub-list of ratings present 506 as disclosed in the detailed description of FIG. 5, such that each entry in the sub-list of ratings present 506 is for the same Ratee_id. In an embodiment, the N sub-list of ratings present 506 comprises one or more ratings obtained from one or more users through one or more user devices connected to the Trac score calculation system. The combining module comprises a compute ratings values module 507 and a ratings combiner 509. The compute ratings values module 507 computes ratings values, that is, a weighted ratings amount measure and a weighted credibility measure for each of the ratings in the N sub-lists of ratings present 506 as disclosed in the detailed description of FIG. 7. The compute ratings values module 507 adds values for the weighted ratings amount measure and the weighted credibility measure to each of the ratings in the N sub-lists of ratings present 506 to create tuples in the N sub-lists of ratings present 506 as disclosed in the detailed description of FIG. 8. The values obtained from the compute ratings values module 507 is then passed to a ratings combiner 509 for further processing. The combining module assembles 508 the single sub-list of ratings present 506 comprising the Ratee_id with corresponding computed rating values into a list. The ratings combiner 509 returns a single merged or combined rating, that is, a unique merged rating on combining the enhanced ratings present tuples, that is, the tuples with the Ratee_id and corresponding weighted ratings amount measures and corresponding weighted credibility measures as disclosed in the detailed description of FIG. 8.

Figure 7:
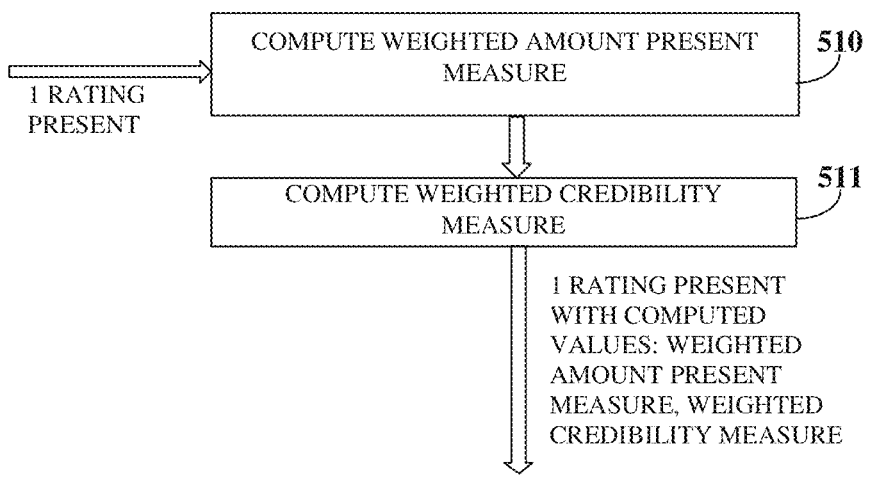
FIG. 7 exemplarily illustrates a flow diagram comprising the steps performed by the Trac score calculation system for computing rating values for each Ratee_id in the N sub-lists of ratings present.

FIG. 7 exemplarily illustrates a flow diagram comprising the steps performed by the Trac score calculation system for computing rating values, that is, a weighted rating amount measure and a weighted credibility measure for each Ratee_id in the N sub-lists of ratings present 506 exemplarily illustrated in FIG. 5. The compute rating values module computes 510 a weighted amount present measure as rating amount measure*credibility measure of the Ratee_id. The compute rating values module computes 511 a weighted credibility measure as credibility measure*credibility measure of the ratee_id. The compute rating values module returns a Ratee_id in the sub-list of ratings present 506 with the computed values of the weighted amount present measure and the weighted credibility measure.

In the computation of the weighted amount present measures and the weighted credibility measures of the Ratee_id in the N sub-list of ratings present 506, the credibility measures affect the weightage provided to the rating amount measures of the Ratee_id in the N sub-list of ratings present 506. The credibility measures also affect the weightage provided to the credibility measures. A sum of the weighted credibility measures of a Ratee_id in a sub-list of ratings present 506 is used to calculate a credibility adjustment, that is, a credibility bump that is added to an unadjusted credibility measure to generate a merged credibility measure of the Ratee_id based on the number of reports and the credibility of the corresponding reports as disclosed in the detailed description of FIG. 8.

Figure 8:
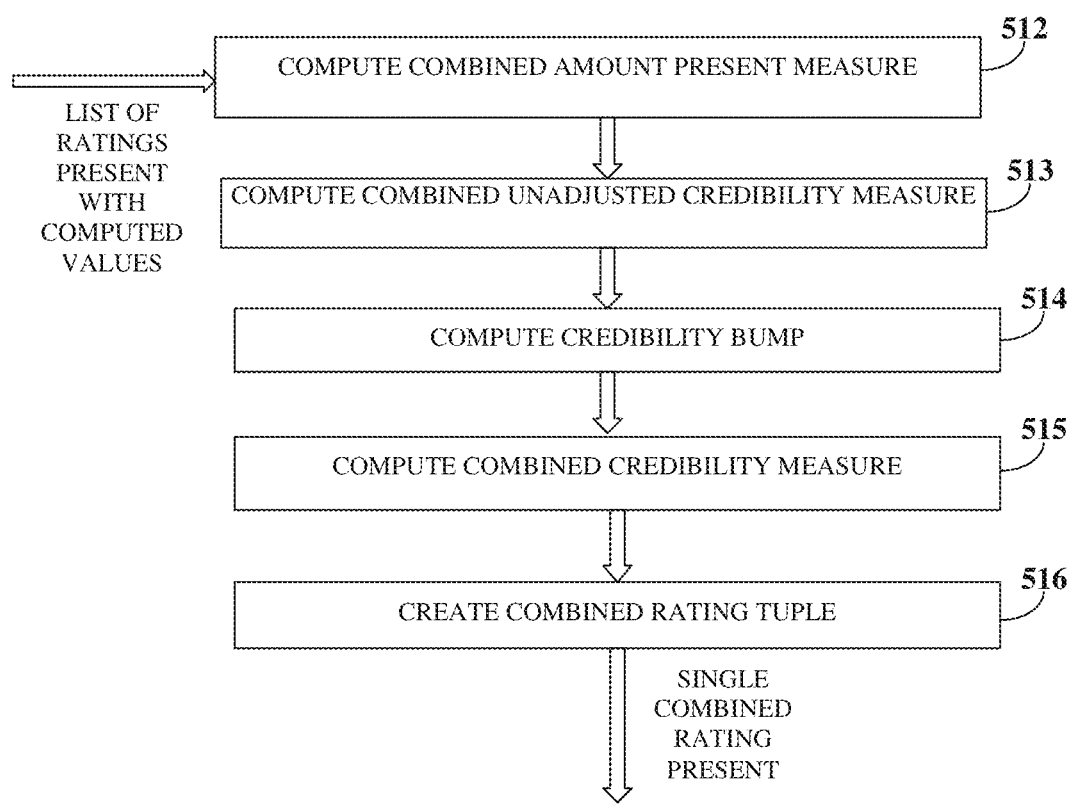
FIG. 8 exemplarily illustrates a flow diagram comprising the steps performed by the Trac score calculation system for generating a unique merged rating with a corresponding merged rating amount measure, and a corresponding merged credibility measure.

FIG. 8 exemplarily illustrates a flow diagram comprising the steps performed by the Trac score calculation system for generating a unique merged rating with a corresponding merged rating amount measure and a corresponding merged credibility measure. The rating combiner 509 exemplarily illustrated in FIG. 6, receives a sub-list of ratings present 506 exemplarily illustrated in FIG. 5, with the computed values of the weighted amount present measure and the weighted credibility measure and creates a single combined rating, that is, a unique merged rating. The Trac score calculation system invokes the rating combiner 509 with a sub-list of ratings present 506 with computed values such that all entries in the sub-list of ratings present 506 are for the same Ratee_id. The rating combiner 509 computes 512 an amount present measure, that is, the merged rating amount measure as Sum(weighted amount present measure)/Sum(credibility measure). The rating combiner 509 computes 513 a combined unadjusted credibility measure as Sum(weighted credibility measure)/Sum(credibility measure). The rating combiner 509 computes 514 a credibility bump as (Sum (weighted credibility measure)*coeff_credbump)–coeff_credbump, where the coefficient coeff_credbump is a predefined constant. The rating combiner 509 computes 515 a credibility measure, that is, the merged credibility measure, as (combined unadjusted credibility measure+credibility bump) that is adjusted to have a minimum value of 0 and a maximum value of 1. The rating combiner 509 creates 516 a combined rating tuple, that is, a tuple in the unique rating list, comprising the unique rating being the rating from the sub-list of the ratings present with the computed combined amount present measure and the computed combined credibility measure. The ratings combiner 509 returns a single merged rating or a combined rating, that is, the unique rating. The merging module assembles 508 the unique rating from each of the N sub-lists of rating present 506 into the unique rating list, that is, the list of unique merged ratings present as disclosed in the detailed description of FIG. 5.

Figure 9:
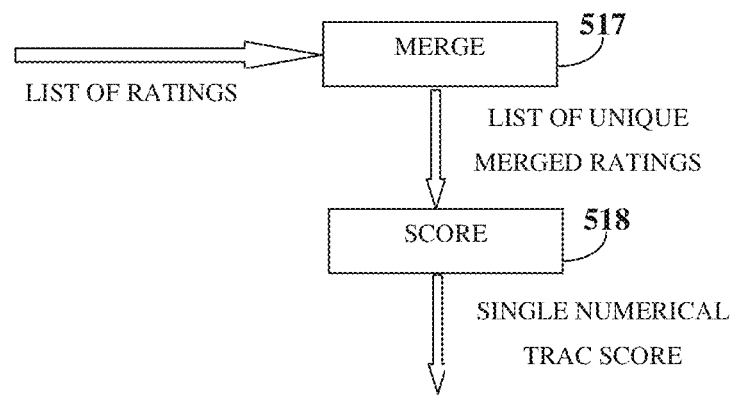
FIG. 9 exemplarily illustrates a flow diagram comprising the steps performed by the Trac score calculation system for generating a single combined rating from a list of one or more merged ratings.

FIG. 9 exemplarily illustrates a flow diagram comprising the steps performed by the Trac score calculation system for generating a single numerical Trac score from a list of one or more merged ratings. The merging module of the Trac score calculation system forms a list of unique merged ratings 517 as exemplarily illustrated in FIG. 5. A score is assigned to each rating by multiplying the amount present and the credibility with the weight and direction from the corresponding question definition. The Trac score calculation system computes a single numerical Trac score 518 from the list of unique merged ratings by accumulating as the sum(Positive Weights)/sum(Score).

Figure 10:
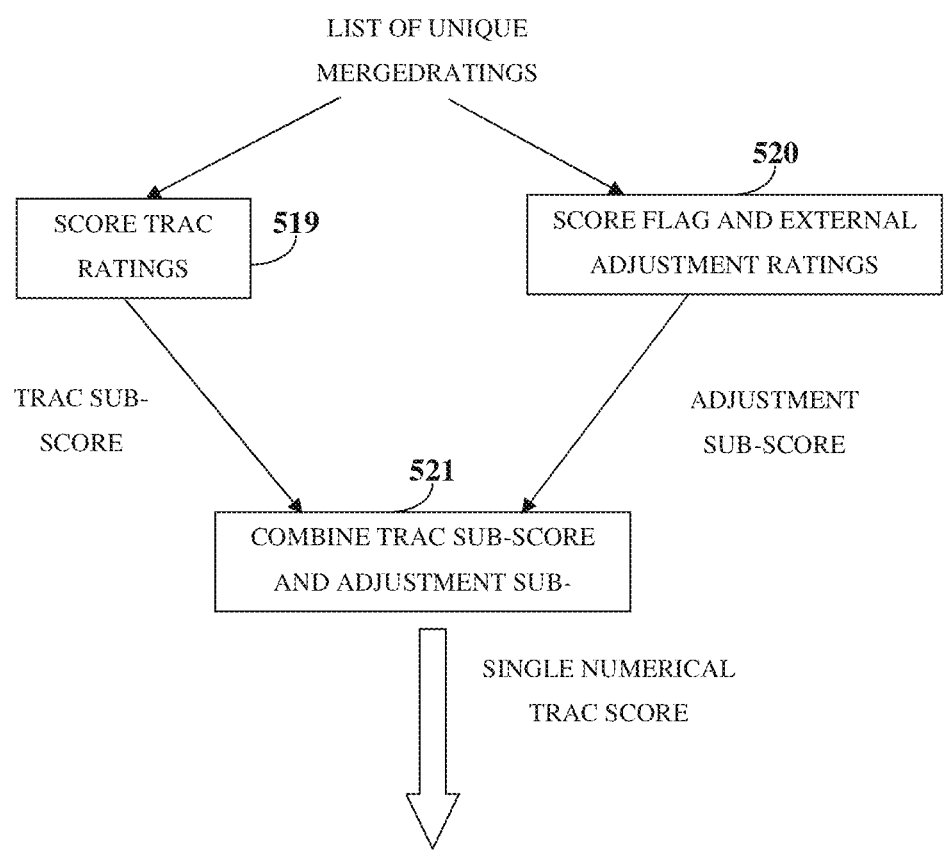
FIG. 10 exemplarily illustrates a flow diagram comprising the steps performed by the Trac score calculation system for generating a single numerical Trac score from the list of unique merged ratings by combining a Trac sub-score and an adjustment sub-score.

FIG. 10 exemplarily illustrates a flow diagram comprising the steps performed by the Trac score calculation system for generating a single numerical Trac score from the list of unique merged ratings by combining a Trac sub-score and an adjustment sub-score. The Trac score calculation system further computes a score Trac ratings 519, score flag, and external adjustment ratings 520. The score Trac ratings forms a Trac sub-score and the score flag and external adjustment ratings forms the adjustment sub-score. The Trac score calculation system combines 521 the Trac sub-score and the adjustment sub-score to determine a single numerical Trac score representing an individual's future employment behavior using past and present employment behavior that are unrelated to skills and job match within a job and across multiple jobs of the individual when combined with public and available external records.

FIGS. 11A-11F exemplarily illustrate tabular representations of computations associated with one or more ratings for determining a Trac score representing an individual's future employment behavior using past and present employment behavior that are unrelated to skills and job match within a job and across multiple jobs of the individual when combined with public and available external records. FIG. 11A exemplarily illustrates a Trac score question list comprising a list of Trac score questions obtained from one or more users. The Trac score calculation system obtains one or more ratings from one or more users through one or more user devices as exemplarily illustrated in FIG. 1. The rating database of the Trac score calculation system comprises the Trac_ID i.e., T_ID, Trac_Weight i.e., T_Weight, Trac_Dir i.e., T_Dir, and the corresponding Trac_question i.e., T_question.

In an embodiment, for a T_ID of T_Good, the corresponding T_weight is 2, the corresponding T_Dir is 1, and the corresponding T_question is "Are they a good worker?". For a T_ID of T_Willing, the corresponding T_weight is 1, the corresponding T_Dir is 1, and the corresponding T_question is "How willing are you to work with them again?". For a T_ID of T_Satis, the corresponding T_weight is 1, the corresponding T_Dir is 1, and the corresponding T_question is "How satisfied are you with their customer service?". For a T_ID of T_Sleeze, the corresponding T_weight is -1, the corresponding T_Dir is -1, and the corresponding T_question is "How sleezy are they?".

FIG. 11B exemplarily illustrates a Flag question list comprising a list of Flag questions obtained from one or more users. The rating database of the Trac score calculation system comprises the Flag_ID, i.e., F_ID, Flag_contribution, i.e., F_Contrib, Flag_Dir, i.e., F_Dir, Flag_override, i.e., F_override, and the corresponding Flag_question, i.e., F_question. In an embodiment, for a F_ID of T_Hygiene, the corresponding F_Contrib is 0.1, the corresponding F_Dir is -1, the corresponding F_Override is Null, and the corresponding F_question is "Does the person have bad hygiene?". For a F_ID of T_Violent, the corresponding F_Contrib is 0, the corresponding F_Dir is -1, the corresponding F_Override is 0, and the corresponding F_question is "Has the person committed a violent crime in the workplace?". For a F_ID of T_CMOH, the corresponding F_Contrib is 0.3, the corresponding F_Dir is 1, the corresponding F_Override is Null, and the corresponding F_question is "Has the person won the congressional medal of honor?".

FIG. 11C exemplarily illustrates an External factors list comprising a list of Flag questions obtained from one or more users. The rating database of the Trac score calculation system comprises the Flag_ID, i.e., F_ID, Flag_contribution, i.e., F_Contrib, Flag_Dir, i.e., F_Dir, Flag_override, i.e., F_override, and the corresponding Flag_question, i.e., F_question. In an embodiment, for a F_ID of T_Badc, the corresponding F_Contrib is 0.1, the corresponding F_Dir is 1, the corresponding F_Override is Null, and the corresponding F_question is "Bad credit". For a F_ID of T_willing, the corresponding F_Contrib is 0.3, the corresponding F_Dir is -1, the corresponding F_Override is Null, and the corresponding F_question is "Litigitious". For a F_ID of T_Satis, the corresponding F_Contrib is 0.3, the corresponding F_Dir is 1, the corresponding F_Override is Null, and the corresponding F_question is "Braodly Acclaimed". For a F_ID of T_Jailed, the corresponding F_Contrib is 0.1, the corresponding F_Dir is -1, the corresponding F_Override is 0, and the corresponding F_question is "Currently Incarcerated".

FIG. 11D exemplarily illustrates a rating table comprising a list Ratee_ID, Rater_ID, Rating_Type, i.e., R_Type, Rating_ID, i.e., R_ID, Rating amount present, i.e., R_Amount Present, and the Rating_Credibility, i.e., R_Credibility. The Trac score calculation system assigns the Ratee_ID of e1, for a Rater_ID of r1 with the Rating_Type of Trac, and the Rating_ID of T_Good, the corresponding R_Amount Present is 0.8 and the corresponding, R_Credibility is 0.4. The Trac score calculation system assigns the Ratee_ID of e1, for a Rater_ID of r2 with the Rating_Type of Trac, and the Rating_ID of T_Willing, the corresponding R_Amount Present is 0.7 and the corresponding, R_Credibility is 0.5. The Trac score calculation system assigns the Ratee_ID of e1, for a Rater_ID of r3 with the Rating_Type of Trac, and the Rating_ID of T_Satis, the corresponding R_Amount Present is 0.9 and the corresponding, R_Credibility is 0.7. The Trac score calculation system assigns the Ratee_ID of e1, for a Rater_ID of r4 with the Rating_Type of Trac, and the Rating_ID of T_Good, the corresponding R_Amount Present is 0.6 and the corresponding, R_Credibility is 0.4. The Trac score calculation system assigns the Ratee_ID of e1, for a Rater_ID of r1 with the Rating_Type of Flag, and the Rating_ID of T_Hygiene, the corresponding R_Amount Present is 0.4 and the corresponding, R_Credibility is 0.4. The Trac score calculation system assigns the Ratee_ID of e1, with the Rating_Type of External factor, and the Rating_ID of T_BadC, the corresponding R_Amount Present is 0.4 and the corresponding, R_Credibility is 0.7.

FIG. 11E exemplarily illustrates a merged rating table comprising a list Ratee_ID, Rater_ID, Rating_Type, i.e., R_Type, Rating_ID, i.e., R_ID, Rating amount present, i.e., R_Amount Present, and the Rating_Credibility, i.e., R_Credibility. The merging module of the Trac score calculation system performs merging actions on the obtained one or more ratings with the credibility and returns a list of unique merged ratings. For R_Type of Trac with R_ID of T_Good, the corresponding R_Amount present is 0.7 and the corresponding R_Credibility is 0.9. For R_Type of Trac with R_ID of T_Willing, the corresponding R_Amount present is 0.8 and the corresponding R_Credibility is 0.5. For R_Type of Trac with R_ID of T_Satis, the corresponding R_Amount present is 0.5 and the corresponding R_Credibility is 1. For R_Type of Trac with R_ID of T_Sleeze, the corresponding R_Amount present is 0.1 and the corresponding R_Credibility is 0.3.

FIG. 11F exemplarily illustrates a Trac sub-score table comprising a list T_ID, T_Weight, T_Dir, Positive weight, Rating amount present, i.e., R_Amount Present, and the Rating_Credibility, i.e., R_Credibility, and the Trac sub-score. For a T_ID of T_Good, the corresponding T_weight is 2, the corresponding T_Dir is 1, the positive weight is 2, the corresponding R_Amount present is 0.7, the corresponding R_Credibility is 0.9, and the corresponding Trac sub-score is 1.26. For a T_ID of T_Willing, the corresponding T_weight is 1, the corresponding T_Dir is 1, the positive weight is 1, the corresponding R_Amount present is 0.8, the corresponding R_Credibility is 0.5, and the corresponding Trac sub-score is 0.4. For a T_ID of T_Satis, the corresponding T_weight is 1, the corresponding T_Dir is 1, the positive weight is 1, the corresponding R_Amount present is 0.5, the corresponding R_Credibility is 1, and the corresponding Trac sub-score is 0.5. For a T_ID of T_Sleeze, the corresponding T_weight is −1, the corresponding T_Dir is −1, the positive weight is 0, the corresponding R_Amount present is 0.1, the corresponding R_Credibility is 0.3, and the corresponding Trac sub-score is −0.03. The Trac score calculation system calculates the sum of positive weights as 4, sum of Trac sub-score is 2.13, and the combined Trac sub-score is 0.53.

The Trac score calculation system computes the Trac score ratings as exemplarily illustrated in the detailed description of FIG. 11F. For each Trac question, a score is calculated as weight*dir*amt_present*credibility. The Trac score calculation system computes the sum of all of the positive weights. The Trac score calculation system computes the sum of the question scores. The Trac score calculation system computes the Trac sub-score using max (0, (sum question scores)/(sum positive scores)).

FIGS. 12A-12B exemplarily illustrate a computer implemented system comprising the Trac score calculation system for determining a Trac score representing an individual's future employment behavior using past and present employment behavior that are unrelated to skills and job match within a job and across multiple jobs of the individual when combined with public and available external records.

FIG. 12A illustrates a Trac score calculation system 1201 comprising at least one processor configured to execute computer program instructions for performing the method illustrated in FIG. 1. In an embodiment, employment behavior of an individual is reported by someone who works with the individual, and from those they do business with. These are not measures of skills possessed and fitness for the job. These are associated with a person, not with an employee. In day to day speak we might refer to someone's track record, meaning the history of what they have done. But track record is hard to follow from job to job, or even from the same job completed before the person that requires the track record was present. In an embodiment, available records, both public and non-public, may contain additional factors. Such available records may be stored in a rating database 1206. A Trac score is built as a single easy to use score and as a means to represent and/or report employment behavior of an individual.

The Trac score calculation system 1201 disclosed herein obtains the adjustment sub-score by processing available external records, both public and private and represents a Trac score which is formed by Trac sub-score with an adjustment sub-score.

In an embodiment, FIG. 12A exemplarily illustrates a connection between Trac score calculating system 1201, user devices namely desktop 1202a, mobile phone 1202b, laptop or tablet 1202c, user interface 1203, users of the system namely rater 1204, and ratee 1205 having a user device for example, mobile phone 1205a, wherein the interfacing is provided between Trac score calculating system 1201 and user devices 1202a 1202b, 1202c, and 1205a. The ratees 1205 are the people with rating history or open to rating history, with an assigned ratee code, and raters 1204 are the people who enter ratings. Some are anonymous and some are registered with the system. Registering enables added credibility as they rate more people and these ratings are found to be credible. A rater 1204 may also be a ratee 1205.

In an embodiment, ratings are collected by web interface in response to a specific invitation sent by email or messaging to one particular person where the invitation includes some information about the rater 1204 and the job to be rated and web interface where a ratee code is entered and anybody with that code may rate. If the rater 1204 is recognized or logged in, these ratings may be for a specific job as selected from a list, or may be general, the ratee code may be specific to a job or be general to the rate, the ratee code may embed if the rater 1204 will rate just job behavior or also rate job summary, the ratee code might be in plain text, on a badge, or in scannable codes that open to the web interface with a specific ratee code. Mobile devices 1202a held by the ratee 1205 or mobile devices held by the rater 1204, with an application that allows entry, or scanning, of the ratee code. When entered this way, the rater 1204 will be already known to the Trac score calculating system 1201. Web browser, desktop 1202a, mobile devices 1202b, and tablets 1202c are provided by a business with a list of people to rate, such as the current food service staff.

In an embodiment, a variant of the Trac score may be created with different weights, or even inverse weights, to certain ratings. In an extreme example, there could be a Sleaze score which is a Trac score calculated such that every reported instance of a customer feeling cheated yields a higher score. Such a score may be useful to help find people for a job that less sleazy people would leave.

Sometimes a person may wish to record ratings for somebody who is not participating as a ratee. In an embodiment, such ratings will be possible using a variety of identification factors. It may be that the identity of the ratee starts unclear, such as: "The tall waiter with a mohawk" but later become clear. When the system concludes that the identity is known, the ratings may be accumulated for the ratee. Should this ratee someday choose to have a Trac score they may find that they are already rated, for good or bad.

In an embodiment, the Trac score is used in the pricing of a policy that ensures that a rated person will be a good worker in a particular job. In another embodiment, the Trac score is combined with a job match score that ensures that a rated person will be a good worker and be able to perform a particular job.

FIG. 12B exemplarily illustrates a computer implemented system 1200 comprising the Trac score calculation system 1201 for determining a Trac score representing an individual's future employment behavior using past and present employment behavior that are unrelated to skills and job match within a job and across plurality of jobs of said individual when combined with public and available external records. The Trac score calculation system 1201 is a computer system that is programmable using a high level computer programming language. In an embodiment, the Trac score calculation system 1201 uses programmed and purposeful hardware. The Trac score calculation system 1201 is implemented on a computing device, for example, a personal computer, a tablet computing device, a mobile computer, a portable computing device, a laptop, a touch device, a workstation, a server, portable electronic device, a network enabled computing device, an interactive network enabled communication device, any other suitable computing equipment, combinations of multiple pieces of computing equipment, etc. In an embodiment, the computing equipment is used to implement applications such as media playback applications, a web browser, an electronic mail (email) application, a calendar application, etc. In another embodiment, the computing equipment, for example, one or more servers are associated with one or more online services. In an embodiment, the Trac score calculation system 1201 is configured as a web based platform, for example, a website hosted on a server or a network of servers.

The Trac score calculation system 1201 communicates with user devices 1202a, 1202b, 1202c, 1202d, 1205a via the network 1227, for example, a short range network or a long range network. The user devices 1202a, 1202b, 1202c, 1202d, 1205a, are electronic devices, for example, personal computers, tablet computing devices, mobile computers, mobile phones, smartphones, portable computing devices, personal digital assistants, laptops, wearable computing devices such as the Google Glass® of Google Inc., the Apple Watch® of Apple Inc., etc., touch centric devices, client devices, portable electronic devices, network enabled computing devices, interactive network enabled communication devices, any other suitable computing equipment, combinations of multiple pieces of computing equipment, etc. In an embodiment, the user devices 1202a, 1202b, 1202c, 1202d, 1205a are hybrid computing devices that combine the functionality of multiple devices. Examples of a hybrid computing device comprise a cellular telephone that includes a media player functionality, a gaming device that includes a wireless communications capability, a cellular telephone that includes a document reader and multimedia functions, and a portable device that has network browsing, document rendering, and network communication capabilities. For purposes of illustration, the user device 1202a, 1202b, 1202c, 1202d, 1205a are user devices of a recruitment system of entities such as offices, educational institutes, etc.

The network 1227 is, for example, the internet, an intranet, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the Trac score calculation system 1201 is accessible to the satellite internet of users, for example, through a broad spectrum of technologies and devices such as cellular phones, tablet computing devices, etc., with access to the internet.

As exemplarily illustrated in FIG. 12B, the Trac score calculation system 1201 comprises a non-transitory computer readable storage medium, for example, a memory unit 1209 for storing programs and data, and at least one processor 1207 communicatively coupled to the non-transitory computer readable storage medium. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 1207. The non-transitory computer readable storage medium is configured to store computer program instructions defined by modules, for example, 201, 1210, 1211, 1212, 1213, 1214, 509, 507, 1216, 1217, 1218, 1219, etc., of the Trac score calculation system 1201. The modules 201, 1210, 1211, 1212, 1213, 1214, 509, 507, 1216, 1217, 1218, and 1219 are installed and stored in the memory unit 1209 of the Trac score calculation system 1201. The memory unit 1209 is used for storing program instructions, applications, and data. The memory unit 1209 is, for example, a random access memory (RAM) or another type of dynamic storage device that stores information and instructions for execution by the processor 1207. The memory unit 1209 also stores temporary variables and other intermediate information used during execution of the instructions by the processor 1207. The Trac score calculation system 1201 further comprises a read only memory (ROM) or another type of static storage device that stores static information and instructions for the processor 1207.

The processor 1207 is configured to execute the computer program instructions defined by the modules, for example, 201, 1210, 1211, 1212, 1213, 1214, 509, 507, 1216, 1217, 1218, 1219 etc., of the Trac score calculation system 1201. The processor 1207 refers to any of one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 1207 is implemented as a processor set comprising, for example, a programmed microprocessor and a math or graphics co-processor. The processor 1207 is selected, for example, from the Intel® processors such as the Itanium® microprocessor or the Pentium® processors, Advanced Micro Devices (AMD®) processors such as the Athlon® processor, UltraSPARC® processors, microSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The Trac score calculation system 1201 disclosed herein is not limited to employing a processor 1207. In an embodiment, the Trac score calculation system 1201 employs a controller or a microcontroller.

As exemplarily illustrated in FIG. 12B, the Trac score calculation system 1201 further comprises a data bus 1220, a network interface 1221, an input/output (I/O) controller 1222, input devices 1223, a fixed media drive 1224 such as a hard drive, a removable media drive 1225 for receiving removable media, output devices 1226, etc. The data bus 1220 permits communications between the modules, for example, 201, 1210, 1211, 1212, 1213, 1214, 509, 507, 1216, 1217, 1218, 1219 etc., of the Trac score calculation system 1201. The network interface 1221 enables connection of the Trac score calculation system 1201 to the network 1227. In an embodiment, the network interface 1221 is provided as an interface card also referred to as a line card. The network interface 1221 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on a transmission control protocol (TCP)/internet protocol (IP), interfaces based on wireless communications technology such as satellite technology, radio frequency (RF) technology, near field communication, etc. The I/O controller 1222 controls input actions and output actions performed by the Trac score calculation system 1201.

The display screen 1208, via the graphical user interface (GUI) 1208a, displays Trac score questions, flag questions obtained from one or more ratings from one or more users. The display screen 1208 is, for example, a video display, a liquid crystal display, a plasma display, an organic light emitting diode (OLED) based display, etc. The Trac score calculation system 1201 provides the GUI 1208a on the display screen 1208. The GUI 1208a is, for example, an online web interface, a web based downloadable application interface, a mobile based downloadable application interface, etc. The display screen 1208 displays the GUI 1208a. The input devices 1223 are used for inputting data into the Trac score calculation system 1201. The input devices 1223 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. The output devices 1226 output the results of operations performed by the Trac score calculation system 1201.

The modules of the Trac score calculation system 1201 comprise a receiving module 1210, a credibility module 1211, an insertion module 1212, a Trac sub-score calculation module 1213, skill profile module 201, and a Trac score computation module 1216 stored in the memory unit 1209 of the Trac score calculation system 1201. The Trac sub-score calculation module 1213 further comprises a merging module 1214, a compute rating value model 507, and a rating combiner 509. The Trac score computation module 1216 further comprises a Trac sub-score combiner module 1217, an adjustment sub-score combiner module 1218, and a Trac score combiner module 1219. The receiving module 1210 obtains one or more ratings from one or more users through one or more user devices connected to the Trac score calculation system 1201. The obtained one or more ratings comprises a Trac score questions list, a flag questions list, and an external factors list. The credibility module 1211 assigns credibility to the obtained ratings by invoking an external credibility process engine 302. The credibility of the rating is estimated based on source of the rating, degree of consistency of the rating with one or more available ratings different from the ratings, recency of the rating, and estimated credibility of one or more users entering the rating.

The external credibility process engine 302 inserts the obtained one or more ratings comprising the credibility into one or more ratings list and updates the credibility for each one or more ratings.

The insertion module 1212 inserts one or more external factor ratings from an external factors list to the obtained ratings by processing available external records, both public and private forms by invoking an exterior external factors engine 402. The exterior external factors engine 402 updates, inserts, deletes or replaces one or more obtained ratings for the same external factor into one or more ratings list. The Trac sub-score calculation module 1213 obtains Trac sub-score by accumulating the obtained ratings weighted by estimated credibility of each of one or more ratings. The Trac score computation module 1216 computes the Trac score by combining a Trac sub-score and an adjustment sub-score obtained by performing merging actions on the obtained one or more ratings. The Trac score is a numerical that reflects an aggregation of the available external records comprising public and private forms weighted by factors that affect the employment behavior.

The Trac score calculation system 1201 further displays additional information accompanied by one or more red flags. The additional information is provided to an employer for consideration before hiring the individual for the job. The Trac score comprises combination of the Trac sub-score and the adjustment sub-score along with said additional information accompanied by the one or more red flags. The Trac score is used for pricing a policy of the individual.

The merging module 1214 performs merging actions on the obtained one or more ratings with the credibility and returns a list of unique merged ratings. The merging module 1214 further combines multiple occurrences of the one or more ratings in the list of ratings present into one entry per rating in the list of unique merged ratings present with a combined amount present measure, that is, the merged amount measure, and a combined credibility measure, that is, the merged credibility measure. The rating combiner 509 of the Trac sub-score calculation module 1213 combines the merged one or more ratings into a final trac score. The Trac score computational module 1216 of the Trac score calculation system 1201 computes a Trac score from the merged ratings. The Trac sub-score combiner module 1217 combines the unique merged one or more ratings of type Trac into a Trac sub-score. The adjustment sub-score combiner module 1218 combines the unique merged one or more ratings of type flag and external into an adjustment sub-score, and the Trac score combiner module 1219 combines the Trac sub-score and the adjustment sub-score into the final Trac score, thereby calculating the Trac score.

The Trac score calculation system 1201 stores the one or more obtained ratings along with the Trac score questions, flag questions required to calculate the Trac score in a rating database 1206 of the Trac score calculation system 1201. The rating database 1206 of the Trac score calculation system 1201 can be any storage area or medium that can be used for storing data and files. In an embodiment, the Trac score calculation system 1201 stores the received information in external databases, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In another embodiment, the rating database 1206 can be a location on a file system. In another embodiment, the rating database 1206 can be remotely accessed by the Trac score calculation system 1201 via the network 1227. In another embodiment, the rating database 1206 is configured as a cloud based database implemented in a cloud computing environment, where computing resources are delivered as a service over the network 1227.

Computer applications and programs are used for operating the modules of the Trac score calculation system 1201. The programs are loaded onto the fixed media drive 1224 and into the memory unit 1209 of the Trac score calculation system 1201 via the removable media drive 1225. In an embodiment, the computer applications and programs are loaded directly on the Trac score calculation system 1201 via the network 1227. The processor 1207 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., etc. The Trac score calculation system 1201 employs the operating system for performing multiple tasks. The operating system is responsible for management and coordination of activities and sharing of resources of the Trac score calculation system 1201. The operating system further manages security of the Trac score calculation system 1201, peripheral devices connected to the Trac score calculation system 1201, and network connections. The operating system employed on the Trac score calculation system 1201 recognizes, for example, inputs provided by a user of the Trac score calculation system 1201 using one of the input devices 1223, the output devices 1226, files, and directories stored locally on the fixed media drive 1224. The operating system on the Trac score calculation system 1201 executes different programs using the processor 1207. The processor 1207 and the operating system together define a computer platform for which application programs in high level programming languages are written.

The processor 1207 of the Trac score calculation system 1201 retrieves instructions defined by the receiving module 1210, the credibility module 1211, the insertion module 1212, the skill profile module 201, the Trac sub-score calculation module 1213, the merging module 1214, the compute rating value model 507, the rating combiner 509, the Trac score computation module 1216, the Trac sub-score combiner module 1217, the adjustment sub-score combiner module 1218, and the Trac score combiner module 1219 for performing respective functions disclosed above. The processor 1207 retrieves instructions for executing the modules, for example, 201, 1210, 1211, 1212, 1213, 1214, 509, 507, 1216, 1217, 1218, 1219, etc., of the Trac score calculation system 1201 from the memory unit 1209. A program counter determines the location of the instructions in the memory unit 1207. The program counter stores a number that identifies the current position in the program of each of the modules, for example, 201, 1210, 1211, 1212, 1213, 1214, 509, 507, 1216, 1217, 1218, 1219 etc., of the Trac score calculation system 1201. The instructions fetched by the processor 1207 from the memory unit 1209 after being processed are decoded. The instructions are stored in an instruction register in the processor 1207. After processing and decoding, the processor 1207 executes the instructions, thereby performing one or more processes defined by those instructions.

At the time of execution, the instructions stored in the instruction register are examined to determine the operations to be performed. The processor 1207 then performs the specified operations. The operations comprise arithmetic operations and logic operations. The operating system performs multiple routines for performing a number of tasks required to assign the input devices 1223, the output devices 1226, and the memory unit 1506 for execution of the modules, for example, 201, 1210, 1211, 1212, 1213, 1214, 509, 507, 1216, 1217, 1218, 1219, etc., of the Trac score calculation system 1201. The tasks performed by the operating system comprise, for example, assigning memory to the modules, for example, 201, 1210, 1211, 1212, 1213, 1214, 509, 507, 1216, 1217, 1218, 1219, etc., of the Trac score calculation system 1201 and to data used by the Trac score calculation system 1201, moving data between the memory unit 1209 and disk units, and handling input/output operations. The operating system performs the tasks on request by the operations and after performing the tasks, the operating system transfers the execution control back to the processor 1207. The processor 1207 continues the execution to obtain one or more outputs. The outputs of the execution of the modules, for example, 201, 1210, 1211, 1212, 1213, 1214, 509, 507, 1216, 1217, 1218, 1219, etc., of the Trac score calculation system 1201 are displayed to a user of the Trac score calculation system 1201 on the output device 1226. In an embodiment, one or more portions of the Trac score calculation system 1201 are distributed across one or more computer systems (not shown) coupled to the network 1227.

The non-transitory computer readable storage medium having embodied thereon, computer program codes comprising instructions executable by at least one processor 1207 for determining a Trac score representing an individual's future employment behavior using past and present employment behavior that are unrelated to skills and job match within a job and across multiple jobs of the individual when combined with public and available external records. The computer program codes comprise a first computer program code for obtaining one or more ratings from one or more users through one or more user devices connected to the Trac score calculation system 1201; a second computer program code for assigning credibility to the obtained ratings by invoking an external credibility process engine, wherein the credibility of the rating is estimated based on source of the rating, degree of consistency of the rating with one or more available ratings different from the ratings, recency of the rating, and estimated credibility of the one or more users entering the rating; a third computer program code for inserting one or more external factor ratings from an external factors list to the obtained ratings by processing available external records, both public and private forms by invoking an exterior external factors engine; a fourth computer program code for obtaining Trac sub-score by accumulating the obtained ratings weighted by estimated credibility of each of the one or more ratings; a fifth computer program code for computing the Trac score by combining a Trac sub-score and an adjustment sub-score obtained by performing merging actions on the obtained one or more ratings, wherein the Trac score is a numerical that reflects an aggregation of the available external records comprising public and private forms weighted by factors that affect the employment behavior.

The non-transitory computer readable storage medium, wherein the fourth computer program code for obtaining the Trac sub-score by accumulating the obtained ratings weighted by estimated credibility of each of the one or more ratings further comprises a sixth computer program code for performing merging actions on the obtained one or more ratings with the credibility and returning a list of unique merged ratings by a merging module 1214 of the Trac score calculation system 1201; and a seventh computer program code for combining the merged one or more ratings into a final trac score and computing a Trac score by a Trac score computation module 1216 of the Trac score calculation system 1201 from the merged ratings.

The non-transitory computer readable storage medium, wherein the seventh computer program code for computing the Trac score by the Trac score computation module 1216 of the Trac score calculation system 1201 further comprises an eighth computer program code for combining the unique merged one or more ratings of type Trac into a Trac sub-score; a ninth computer program code for combining the unique merged one or more ratings of type flag and external into an adjustment sub-score; and a tenth computer program code for combining the Trac sub-score and the adjustment sub-score into the final Trac score thereby calculating the Trac score by the Trac score calculation system 1201.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the computer implemented method and the Trac score calculation system 1201 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the computer implemented method and the Trac score calculation system 1201 disclosed herein are implemented as programmed elements, or non-programmed elements, or any suitable combination thereof.

Where databases are described such as the rating database 1206, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the Trac score calculation system 200, the databases are integrated to communicate with each other for enabling simultaneous updates of data linked across the databases, when there are any updates to the data in one of the databases.

The computer implemented method and the Trac score calculation system 1201 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The computer implemented method and the Trac score calculation system 1201 disclosed herein are not limited to a particular computer system platform, processor, operating system, or network. In an embodiment, one or more aspects of the computer implemented method and the Trac score calculation system 1201 disclosed herein are distributed among one or more computer systems, for example, servers configured to provide one or more services to one or more client computers, or to perform a complete task in a distributed system. For example, one or more aspects of the computer implemented method and the Trac score calculation system 1201 disclosed herein are performed on a client-server system that comprises components distributed among one or more server systems that perform multiple functions according to various embodiments. These components comprise, for example, executable, intermediate, or interpreted code, which communicate over a network using a communication protocol. The computer implemented method and the Trac score calculation system 1201 disclosed herein are not limited to be executable on any particular system or group of systems, and are not limited to any particular distributed architecture, network, or communication protocol.

The foregoing examples have been provided merely for explanation and are in no way to be construed as limiting of the method and the Trac score calculating system 1201 disclosed herein. While method and the Trac score calculating system 1201 have been described with reference to various embodiments, it is understood that the words, which have been used herein, are words of description and illustration, rather than words of limitation. Furthermore, although the method and the Trac score calculating system 1201 have been described herein with reference to particular means, materials, and embodiments, the method and the Trac score calculating system 1201 are not intended to be limited to the particulars disclosed herein; rather, the method and the Trac score calculating system 1201 extend to all functionally equivalent structures, methods and uses, such as are within the scope of the appended claims. While multiple embodiments are disclosed, it will be understood by those skilled in the art, having the benefit of the teachings of this specification, that method and the Trac score calculating system 1201 disclosed herein are capable of modifications and other embodiments may be effected and changes may be made thereto, without departing from the scope and spirit of the method and the Trac score calculating system 1201 disclosed herein.

We claim:

1. A method of determining a Trac score representing an individual's future employment behavior using past and present employment behavior that are unrelated to skills and job match within a job and across plurality of jobs of said individual when combined with public and available external records, the method employing a Trac score calculation system comprising at least one processor configured to execute computer program instructions for performing the method comprising:

obtaining one or more ratings from one or more users through one or more user devices connected to the Trac score calculation system;

assigning credibility to the obtained ratings by invoking an external credibility process engine, wherein the credibility of the rating is estimated based on source of the rating, degree of consistency of the rating with one or more available ratings different from the ratings, recency of the rating, and estimated credibility of the one or more users entering the rating;

inserting one or more external factor ratings from an external factors list to the obtained ratings by processing available external records, both public and private forms by invoking an exterior external factors engine, wherein the exterior external factors engine one or more of deletes and replaces the one or more obtained ratings for the same external factor into one or more ratings list;

performing merging actions on the obtained one or more ratings with the credibility and returning a list of unique merged ratings, by a merging module of the Trac score calculation system;

combining the unique merged one or more ratings of type Trac into a Trac sub-score, by a Trac sub-score combiner module of the Trac score calculation system, wherein the Trac sub-score is determined by a set of formulas comprising:

for each question of the type Trac:

$$\text{question score} = \text{weight}*\text{dir}*\text{amt present}*\text{credibility};$$

and $$\text{final Trac sub-score} = \max(0,(\text{sum of all question scores of the type Trac})/(\text{sum positive scores}));$$

combining the unique merged one or more ratings of type flag and external into an adjustment sub-score by an adjustment sub-score combiner module of the Trac score calculation system, wherein the adjustment sub-score is calculated by a formula:

$$\text{adjustment sub-score} = \text{sum}(\text{weight}*\text{dir}*\text{amount present}*\text{credibility}),$$

and wherein the adjustment sub-score is changed to an override value when an amount present and credibility of any of the unique merged one or more ratings of type flag and external are greater than a threshold; and combining the Trac sub-score and the adjustment sub-score into the final Trac score, by a Trac score computation module of the Trac score calculation system, wherein the final Trac score is computed using relational databases, object-based models, distributed databases, merging, and custom algorithms.

2. The method of claim 1, further comprising displaying additional information accompanied by one or more red flags, wherein the additional information is provided to an employer for consideration before hiring the individual for the job, and wherein the Trac score comprises the combination of the Trac sub-score and the adjustment sub-score along with the additional information accompanied by the one or more red flags.

3. The method of claim 1, wherein the Trac score is used to create a pricing policy that determines whether the individual has the employment behavior needed for performing a future job.

4. The method of claim 1, wherein the Trac score of the individual is combined with a job match score of the individual for a particular job, to determine whether the individual has the future employment behavior, the skills, and the fitness for performing the particular job.

5. The method of claim 1, wherein the obtained one or more ratings comprises a Trac score questions list, a flag questions list, and an external factors list.

6. The method of claim 1, wherein the external credibility process engine inserts the obtained one or more ratings comprising the credibility into the one or more ratings list and updates the credibility for each the one or more ratings.

7. The method of claim 1, wherein the exterior external factors engine one or more of inserts and updates the one or more obtained ratings for the same external factor into the one or more ratings list.

8. The method of claim 1, wherein the merging module combines a plurality of occurrences of ratings in a list of ratings present into one entry per rating in the list of unique merged ratings present with a merged amount measure and a combined credibility measure, wherein the Trac score calculation system is configured to invoke the merging module with a list of ratings present, wherein the merging module sorts the entries in the list of ratings present by Ratee_id and splits the list of ratings present into N sub-lists of ratings present, wherein each of the sub-lists of ratings present comprises entries for a common rating for a Ratee_id.

9. A Trac score calculation system for determining a Trac score representing an individual's future employment behavior using past and present employment behavior that are unrelated to skills and job match within a job and across plurality of jobs of the individual when combined with public and available external records, the system comprising:

a non-transitory computer readable storage medium configured to store computer program instructions defined by modules of the Trac score calculation system; and at least one processor communicatively coupled to the non-transitory computer readable storage media, the at least one processor configured to execute the computer program instructions defined by modules of the Trac score calculation system, the modules comprising:

a receiving module for obtaining one or more ratings from one or more users through one or more user devices connected to the Trac score calculation system;

a credibility module for assigning credibility to the obtained ratings by invoking an external credibility process engine, wherein the credibility of the rating is estimated based on source of the rating, degree of consistency of the rating with one or more available ratings different from the ratings, recency of the rating, and estimated credibility of the one or more users entering the rating;

an insertion module for inserting one or more external factor ratings from an external factors list to the obtained ratings by processing available external records, both public and private forms by invoking an exterior external factors engine, wherein the exterior external factors engine one or more of deletes and replaces the one or more obtained ratings for the same external factor into one or more ratings list;

a merging module for performing merging actions on the obtained one or more ratings with the credibility and returning a list of unique merged ratings;

a Trac sub-score combiner module for combining the unique merged one or more ratings of type Trac into a Trac sub-score, wherein the Trac sub-score is calculated by a set of formulas comprising:

for each question of the type Trac:

$$\text{question score} = \text{weight} * \text{dir} * \text{amt present} * \text{credibility};$$

and $$\text{final Trac sub-score} = \max(0, (\text{sum of all question scores of the type Trac})/(\text{sum positive scores}));$$

an adjustment sub-score combiner module for combining the unique merged one or more ratings of type flag and external into an adjustment sub-score, wherein the adjustment sub-score is calculated by a formula:

$$\text{adjustment sub-score} = \text{sum}(\text{weight} * \text{dir} * \text{amount present} * \text{credibility}),$$

and wherein the adjustment sub-score is changed to an override value when an amount present and credibility of any of the unique merged one or more ratings of type flag and external are greater than a threshold; and a Trac score computation module for combining the Trac sub-score and the adjustment sub-score into the final Trac score, wherein the final Trac score is computed using relational databases, object-based models, distributed databases, merging, and custom algorithms.

10. The system of claim 9, further comprising displaying additional information accompanied by one or more red flags, wherein the additional information is provided to an employer for consideration before hiring the individual for the job, and wherein the Trac score comprises the combination of the Trac sub-score and the adjustment sub-score along with the additional information accompanied by the one or more red flags.

11. The system of claim 9, wherein the Trac score is used for pricing a policy of the individual.

12. The system of claim 9, wherein the obtained one or more ratings comprises a Trac score questions list, a flag questions list, and an external factors list.

13. The system of claim 9, wherein the external credibility process engine inserts the obtained one or more ratings comprising the credibility into the one or more ratings list and updates the credibility for each the one or more ratings.

14. The system of claim 9, wherein the exterior external factors engine one or more of inserts and updates the one or more obtained ratings for the same external factor into the one or more ratings list.

15. The system of claim 9, wherein the merging module combines a plurality of occurrences of ratings in a list of ratings present into one entry per rating in the list of unique merged ratings present with a merged amount measure and a combined credibility measure, wherein the Trac score calculation system is configured to invoke the merging module with a list of ratings present, wherein the merging module sorts the entries in the list of ratings present by Ratee_id and splits the list of ratings present into N sub-lists of ratings present, wherein each of the sub-lists of ratings present comprises entries for a common rating for a Ratee_id.

16. A non-transitory computer readable storage medium having embodied thereon, computer program codes comprising instructions executable by at least one processor for determining a Trac score representing an individual's future employment behavior using past and present employment behavior that are unrelated to skills and job match within a job and across plurality of jobs of the individual when combined with public and available external records, the computer program codes comprising:

a first computer program code for obtaining one or more ratings from one or more users through one or more user devices connected to the Trac score calculation system;

a second computer program code for assigning credibility to the obtained ratings by invoking an external credibility process engine, wherein the credibility of the rating is estimated based on source of the rating, degree of consistency of the rating with one or more available ratings different from the ratings, recency of the rating, and estimated credibility of the one or more users entering the rating;

a third computer program code for inserting one or more external factor ratings from an external factors list to the obtained ratings by processing available external records, both public and private forms by invoking an exterior external factors engine, wherein the exterior external factors engine one or more of deletes and replaces the one or more obtained ratings for the same external factor into one or more ratings list;

a fourth computer program code for performing merging actions on the obtained one or more ratings with the credibility and returning a list of unique merged ratings, by a merging module of the Trac score calculation system;

a fifth computer program code for combining the unique merged one or more ratings of type Trac into a Trac sub-score, by a Trac sub-score combiner module of the Trac score calculation system, wherein the Trac sub-score is calculated by a set of formulas comprising:

for each question of the type Trac:

$$\text{question score} = \text{weight} * \text{dir} * \text{amt present} * \text{credibility};$$

and $$\text{final Trac sub-score} = \max(0, (\text{sum of all question scores of the type Trac})/(\text{sum positive scores}));$$

a sixth computer program code for combining the unique merged one or more ratings of type flag and external into an adjustment sub-score by an adjustment sub-score combiner module of the Trac score calculation system, wherein the adjustment sub-score is calculated by a formula:

$$\text{adjustment sub-score} = \text{sum}(\text{weight} * \text{dir} * \text{amount present} * \text{credibility}),$$

and wherein the adjustment sub-score is changed to an override value when an amount present and credibility of any of the unique merged one or more ratings of type flag and external are greater than a threshold; and a seventh computer program code for combining the Trac sub-score and the adjustment sub-score into the final Trac score, by a Trac score computation module of the Trac score calculation system, wherein the Trac score is computed using relational databases, object-based models, distributed databases, merging, and custom algorithms.

17. The non-transitory computer readable storage medium of claim 16, wherein the merging module combines a plurality of occurrences of ratings in a list of ratings present into one entry per rating in the list of unique merged ratings present with a merged amount measure and a combined credibility measure, wherein the Trac score calculation system is configured to invoke the merging module with a list of ratings present, wherein the merging module sorts the entries in the list of ratings present by Ratee_id and splits the list of ratings present into N sub-lists of ratings present, wherein each of the sub-lists of ratings present comprises entries for a common rating for a Ratee_id.

* * * * *